Figure 1:
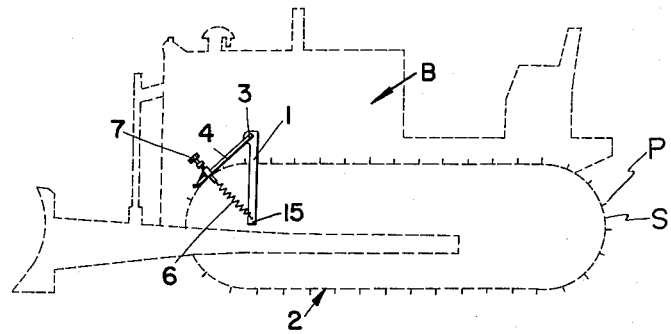

May 2, 1961 KOICHI UEMURA 2,982,584
AUTOMATIC CLEANING DEVICE FOR TRACTOR SHOES
Filed Feb. 24, 1959 3 Sheets-Sheet 1

May 2, 1961 KOICHI UEMURA 2,982,584
AUTOMATIC CLEANING DEVICE FOR TRACTOR SHOES
Filed Feb. 24, 1959 3 Sheets-Sheet 3

United States Patent Office 2,982,584
Patented May 2, 1961

2,982,584

AUTOMATIC CLEANING DEVICE FOR TRACTOR SHOES

Koichi Uemura, 2411 Ichinohora, Kamikanuki, Numazo, Shizuoka-ken, Japan

Filed Feb. 24, 1959, Ser. No. 795,107

Claims priority, application Japan Feb. 26, 1958

11 Claims. (Cl. 305—12)

This invention relates to an automatic cleaning device for the shoes of an endless band, or track, particularly for those of a tractor. The device under this subject is an automatic arrangement to continuously scrape off, during the tractor running, clay, earth, sand, snow or the like which has adhered to the shoes while the tractor is propelled.

When the said sticky substance as clay or earth should stick on the shoes of a tractor, the necessary tractive action at the pawl of the shoes against the ground to drive the tractor back and forth would be badly decreased until, eventually, the propulsion of the tractor may almost be prevented due to the slip between the shoes and the ground surface.

Accordingly, the said substance adhered to the tractor shoes must be taken off from time to time obliging the tractor to be stopped each time for a substantial interval. Besides, some instruments to scrape off the same together with the human power to perform such a task have been necessitated without saying. And a considerable loss of time and labour has heretofore been inevitable which facts have greatly depressed the operation efficiency of the tractor.

It is an object of this invention, in order to relieve the above said trouble, to provide a device automatically and continuously scraping off, during the tractor running, the adhered substances as clay, earth or the like on tractor shoes while the tractor is propelled.

The above said object is accomplished according to this invention by an arrangement, to be provided for each endless band or track of the tractor, comprising a scraper blade member having one or more guide cam plates removably fixed thereto, two sets of supporting arm members removably but rigidly carrying the said scraper blade member at both ends, a fixing member to support the said supporting arm members spaced apart in parallel, two sleeve members fixed to the arm members, for example, by welding, the said sleeve members being rigidly connected with each other, an inverted-U shaped member of which both legs slidably pass through the bores of the said sleeve members and have hooks at their ends, tension springs spanned between the said hooks and the above said fixing members, and an adjusting screw arrangement disposed between the middle point of the base part of the inverted-U shaped member and the said connecting member of the sleeve members, so that the said scraping blade member may be pressed with a certain necessary pressure against the surfaces of successively passing shoes of the tractor track, keeping a suitable angle there-between, the guide cam plates causing the scraper blade smoothly to climb the pawls of the shoes and to slide down the same successively during the advancing movement of the track.

As may be seen in the above description, the essential function accomplished in the device according to this invention resides in that the scraper blade member is pressed with a pressure against the shoe keeping a suitable angle therebetween, and the scraper member is made to be able to climb the pawls and to slide down the same successively by means of the guide cam plates and spring action during the progressing movement of the tractor.

Now, the same function as stated above may well be realized also with a modification, according to this invention, characterized by the construction comprising two connecting members fixed at both sides of the tractor body and stretched forward or rearward obliquely, like antennae, of the said body, a fixing bar and a supporting rod of which lengths correspond to the overall width of the tractor including both tracks thereof and which are supported by and bridging over the said connecting members, a pair of chair shaped frames of which side view is like an L character (or J), and at mid points along back sides of which the said chair members are hingeably supported on the said supporting rod for both sides of the tractor, and tension spring arrangements spanned, through adjusting screw devices, between the tops of the chair members and the fixing bar, the front edges of the chair members carrying scraper blade members removably but rigidly fixed thereto, and the scraper blades being provided with one or more guide cam plates removably fixed thereto so that the same function as stated in the above described embodiment may be attained.

The features and the functions of the arrangements according to this invention may more closely be understood when the explanation hereinbelow is read with reference to the drawings.

Figure 2:
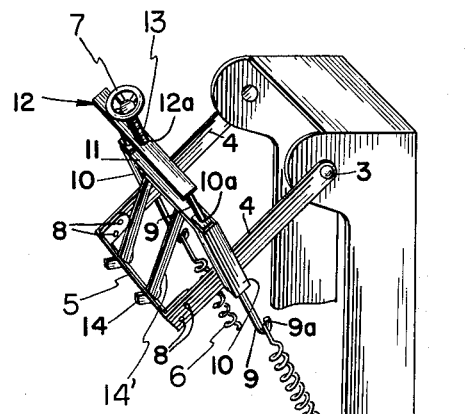
Figure 4:
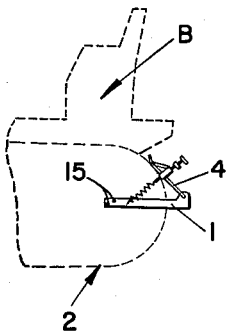
Figure 3:
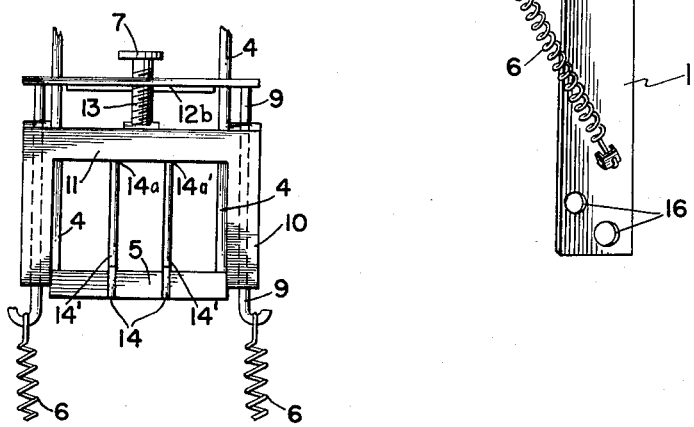
Figure 6:
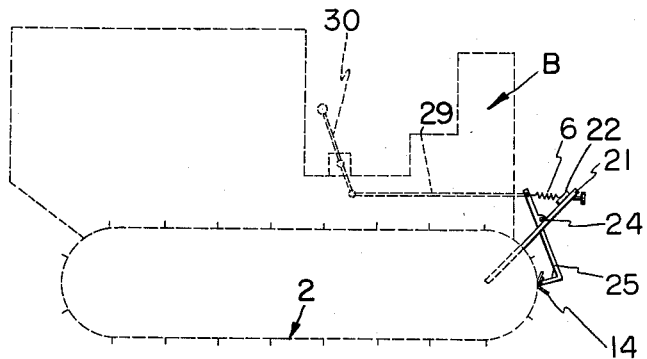
Figure 7:
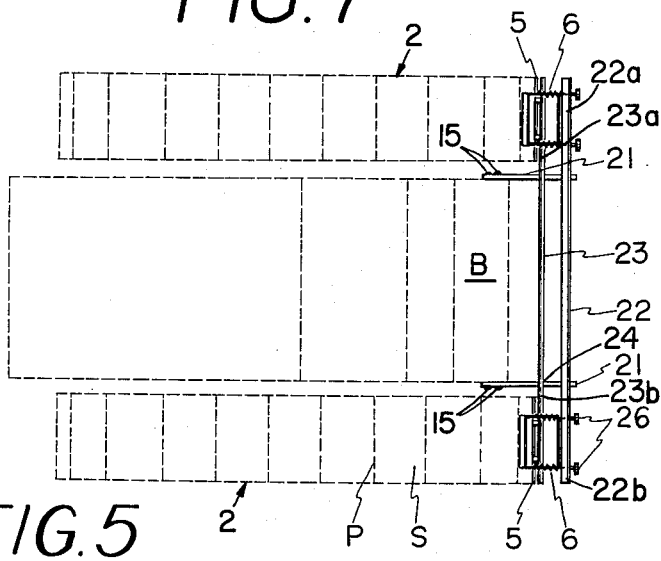
Figure 5:
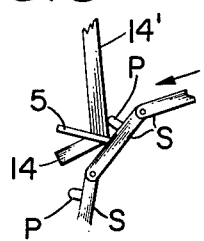
Figure 8:
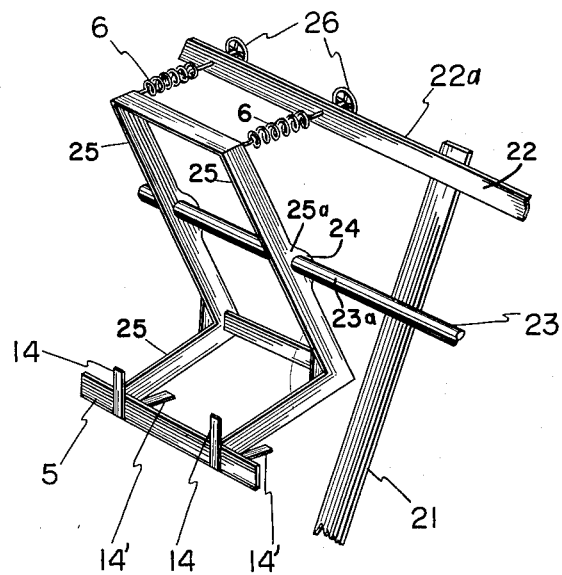
Figure 9:
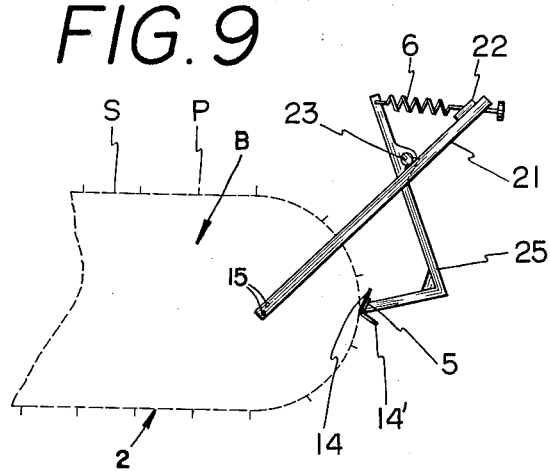

Fig. 1 is a general view of one embodiment of this invention, shown in schematic manner, which is provided in association with each endless band, or track of the tractor toward the front side thereof, and in which case earth or sand, etc. which has adhered to the shoes of each track may be scraped off towards the front of the tractor, Fig. 2 is a perspective view of the frame construction of the embodiment in Fig. 1, Fig. 3 is a front view of the above said arrangement, Fig. 4 schematically shows a general view of the same when it is attached on the rear-side of the tractor, Fig. 5 is an enlarged cross sectional view of the scraper blade disposed on the shoes, guide cam plates being shown therewith, Fig. 6 shows a general view of another embodiment of this invention which is equipped at the rearside and arranged such that earth, sand, etc. may be scraped off rearwards, Fig. 7 shows a plan view of the arrangement of Fig. 6, Fig. 8 is a perspective view of the frame construction of the embodiment shown in Fig. 6, and Fig. 9 is a sectional side view along the line (A—A) in Fig. 7.

Then, referring to Figs. 1, 2 and 3, which show an embodiment, the construction of which may be explained as the following: The fixing member 1 which may be of mild steel is attached, as by bolts 15 passed through bolt holes 16 formed therein, to the tractor body B so as to be astride one of the endless bands, or tracks 2 of the tractor, and vertically thereover at the front side of the tractor, to which fixing member 1 are hinged two arms 4 at the hinging point 3, and at the opposite ends of the arms 4 there is bridged over and removably but rigidly attached, as by bolt screws 8, a scraper blade member 5 made of hard metal such as special steel. To the said both arms 4 are fixed, for example by welding, guiding sleeves 10, respectively, which are rigidly connected by a connecting member 11. A hanging member 12 shaped as inverted-U is mounted over the said connecting member in such a manner that the both legs 9 of the said hanging member 12 are slidably passed through the bores 10a of the sleeves 10, and an adjusting screw 13 is provided between the hanging member 12 and the connecting member 11 in such manner that the screw is introduced into the internally threaded bore 12a at the boss 12b provided at the base center of the said inverted- U shaped member 12 and is abutted at the end 13a on the middle point of the said connecting member 11. At the both ends of the inverted-U shaped hanging member 12 there are formed hooks 9a, respectively, and two tension springs 6 are spanned between the said hooks and the above said fixing member 1. Thus the scraper blade 5 may be pressed with a sufficient pressure necessary to scrape off the adhered substance on the tractor shoe S under the influence of the said spring 6, keeping a suitable angle therebetween, the said pressure being suitably adjusted by rotating the said screw 13 to change the tension of the spring 6. Each shoe S has, however, a pawl p (see Fig. 5) over which the scraper blade 5 must climb every time it is faced. For this purpose, on the scraper blade 5 are provided one or more sets of guide cam plates (14, 14'), which may be of a suitable hard material such as steel, synthetic resin or the like. These guide cam plates are rigidly but removably fixed on the scraper blade, and various shapes of guiding contour for the cam plate may be choiced according to the conditions of the shoes. When the shoes are advancing in the direction as shown with an arrow in Fig. 5, the slant edge of the guide cam plate 14' contacts the edge of the pawl p and the contact point shifts along the contour line which may be provided for the guide cam plates so that the scraper blade may be raised in opposition to the force of tension spring 6, or may climb the pawl p by the slope action and then, under the pull of the spring, it may slide it down onto the opposite side of the pawl. Thus, in accordance with the cooperation of the guide cam plates and the tension springs, the up and down action of the scraper blade at each pawl may smoothly and successively be accomplished. One of the guide cam plates of one set may be elongated to be jointed with the connecting member 11, as at 14a and 14a', Fig. 3, and may be utilized as a strut to reenforce the frame.

For scraper blades for tractor shoes on which heads of shoe bolts protrude, a bolt clearance cut may be provided in the blade edge, the size and location thereof corresponding to the said heads of the shoe bolts.

The arrangement described above may as well be utilized as above also in case where it is disposed at the rear side of the tractor as shown in Fig. 4; earth, sands or the like being scraped off rearward in this case.

The effectiveness according to this invention may advantageously be realized also when it is embodied as according to the drawings Figs. 7, 8 and 9.

In this case, the device is arranged as the following: At the both sides of the tractor body there are attached, as by bolts 15 passed through bolt holes formed therein, on a part of the tractor body, two connecting members 21 made of, for example, rolled profile steel which are obliquely, like antennae, stretched forward or rearward, on which are fixed a supporting rod 23 and fixing bar 22, bridging the said connecting members 21 transversely as the tractor body, the said supporting rod 23 and fixing bar 22 are offset from the tractor body by the length corresponding to the endless band, or track 2 to right and left, a pair of chair-shaped frames 25 of which side view is like an L, are hingeably mounted on the supporting rod 23, with the hinges at the mid points 25a along the back sides of the chair over the both extension portions 23a, 23b of the rod beyond the connecting members 21 and tension spring arrangements 6 are spanned, through adjusting screw devices 26, between the tops of the chair shaped frame and the fixing bar 22, the front edges of the chair frames 25 carrying the scraper blade members 5 are removably but rigidly fixed thereto, and it is evident that the scraper blade 6 provided with one or more guide cam plates 14, 14' may operate just similarly as the above stated case without further explanation.

In this type of embodiment, however, the supporting rod 23 and the fixing bar 22 are supported by the connecting members 21 spaced apart by the breadth of the tractor body, and the scraper systems are supported by the above said members 22 and 23 over the extension portions thereof 22a, 22b and 23a, 23b, respectively, just above the track, so that the whole arrangement can be disposed within the width of the tractor which fact may be very much advantageous as for handling the tractor.

Further, providing a handling lever 30 at the operator seat and connecting the above said chair shaped frame and this lever by means of a link system 29, an engagement of the scraper system on the shoes of each track and the releasing thereof may readily be accomplished. Fig. 6 showing such an equipment schematically.

Having thus described the invention, what is claimed as new and desired to be secured by Letters Patent is:

1. Apparatus for cleaning dirt and the like from the shoes of an endless series thereof forming a track of a tractor, at least some of said shoes each having a protruding pawl, comprising a tractor connection member adapted for attachment to a body portion of said tractor, an arm member connected to said connection member for pivotal movement in a plane substantially parallel to the general plane of crawling movement of said track, a blade member attached to a free end of said arm and disposed substantially perpendicular to said plane of movement of said arm, a blade cam member arranged and constructed for operation association with the pawls of said shoes to lift said blade over each pawl which passes said blade during said movement of the track, and bias means for biasing said blade against the surface to be cleaned of a shoe in said track.

2. Apparatus as set forth in claim 1, said blade cam member consisting of a bar attached to said blade substantially perpendicular thereto and extending angularly outward therefrom within said plane of movement of the track.

3. Apparatus as set forth in claim 2, and a second blade cam member consisting of a bar attached to said blade substantially perpendicular thereto and extending angularly outward therefrom on the side of said blade opposite the first said blade cam member within said plane of movement of the track for guiding the downward movement of said blade in response to said bias upon each said pawl having passed under said blade.

4. Apparatus for cleaning dirt and the like from the shoes of an endless series thereof forming a track of a tractor, at least some of said shoes each having a protruding pawl, comprising a tractor fixing member adapted for attachment to a body portion of said tractor, a connecting bar attached to and arranged and constructed with respect to said fixing member to extend substantially across the width of said track, a supporting rod attached to said fixing member and disposed generally parallel to and substantially coextensive with said connecting bar and interior thereof with respect to the body of said tractor, said connecting bar and supporting rod arranged and constructed with respect to said fixing member to be disposed exterior of the periphery of said track, a pair of coextensive arms connected substantially at their midpoints to said supporting rod for pivotal movement in a plane substantially parallel to the general plane of crawling movement of said track, each said arm having a free end arranged to extend in a direction with respect to said supporting rod which is generally opposite that of said connecting bar, a blade member connected between said free ends of said arms, at least one blade cam member extending angularly outward from said blade arranged and constructed for operation association with the pawls of said shoes to lift said blade over each pawl which passes said blade during said movement of the track, and spring bias means interconnecting said arms and said connecting bar for biasing said blade against the tracking surface of a shoe in said track.

5. Apparatus for cleaning dirt and the like from the shoes of an endless series thereof forming a track of a tractor, at least some of said shoes each having a protruding pawl, comprising a tractor connection member adapted for attachment to a body portion of said tractor, an arm member connected to said connection member for pivotal movement in a plane substantially parallel to the general plane of crawling movement of said track, a blade member attached to a free end of said arm and disposed substantially perpendicular to said plane of movement of said arm, a blade cam member arranged and constructed for operation association with the pawls of said shoes to lift said blade over each pawl which passes said blade during said movement of the track, bias means for biasing said blade against the surface to be cleaned of a shoe in said track, and means for adjusting the amount of bias afforded by said bias means comprising sleeve means connected to said arm, a hanging member extending through said sleeve means, said bias means attached to an end of said hanging member at one end of said sleeve means, and an adjustment member connected to the opposite end of said hanging member and operably associated with a surface of said sleeve means for bias adjusting movement therebetween.

6. Apparatus for cleaning dirt and the like from the shoes of an endless series thereof forming a track of a tractor, at least some of said shoes each having a protruding pawl, comprising a generally U-shaped tractor connection member adapted for attachment to a body portion of said tractor and adapted to span the width of said track, two arm members each connected at one of its ends to each leg portion of said connection member and adjacent the bridge portion of said U-shaped tractor connection member for pivotal movement in a plane parallel to the general plane of crawling movement of said track, a blade member removably attached between the respective ends of said arm members which are opposite said one end, said blade member disposed substantially perpendicular to said planes of movement of said arms, at least one blade cam member attached to said blade arranged and constructed to extend angularly outward therefrom within said plane of movement of the track for operation association with the pawls of said shoes to lift said blade over each pawl which passes said blade during said movement of the track, and spring bias means interconnecting each said arm and each said leg portion of said tractor connection member for biasing said blade against the tracking surface of a shoe in said track.

7. Apparatus for cleaning dirt and the like from the shoes of an endless series thereof forming a track of a tractor, at least some of said shoes each having a protruding pawl, comprising a generally U-shaped tractor connection member adapted for attachment to a body portion of said tractor and adapted to span the width of said track, two arm members each connected at one of its ends to each leg portion of said connection member and adjacent the bridge portion of said U-shaped tractor connection member for pivotal movement in a plane parallel to the general plane of crawling movement of said track, a blade member removably attached between the respective ends of said arm members which are opposite said one end, said blade member disposed substantially perpendicular to said planes of movement of said arms, at least one blade cam member attached to said blade arranged and constructed to extend angularly outward therefrom within said plane of movement of the track for operation association with the pawls of said shoes to lift said blade over each pawl which passes said blade during said movement of the track, spring bias means interconnecting each said arm and each said leg portion of said tractor connection member for biasing said blade against the tracking surface of a shoe in said track, and sleeve means connected to each of said two arm members, a sleeve cross bar member attached between said sleeve means, a generally U-shaped hanging member the leg portions thereof extending through each said sleeve means, said spring bias means attached to each free end of said leg portions of the hanging member at one end of each said sleeve means, and a screw-type adjustment member in threaded engagement in a bore through the bridge portion of said U-shaped hanging member and operably associated with a surface of said sleeve cross bar member for bias adjusting movement therebetween.

8. A tractor having at least one track formed by an endless series of shoe portions, each shoe portion having a pawl which protrudes outwardly of the track surface thereof, and said tractor having apparatus disposed generally at an end thereof for cleaning dirt and the like from said track surface of the shoe portions, said apparatus comprising a fixing member attached at one of its ends to a body portion of said tractor and extending to termination at its other end at a location exterior of the periphery of an upper portion of said track substantially within a plane parallel to the general plane of crawling movement of said track, an arm member connected at one of its ends to said fixing member for pivotal movement within said parallel plane, a blade member attached to the other end of said arm disposed across the width of said track, a cam member extending angularly outward from said blade within said general plane of movement of the track and arranged and constructed to be actuated upon contact by each said pawl successively during said movement of the track to lift said blade over each pawl as it passes under the blade, and bias means for biasing said blade of the apparatus against said track surface of the track.

9. A tractor having at least one track formed by an endless series of shoe portions, each shoe portion having a pawl which protrudes outwardly of the track surface thereof, and said tractor having apparatus disposed generally at an end thereof for cleaning dirt and the like from said track surface of the shoe portions, said apparatus comprising a fixing member attached at one of its ends to a body portion of said tractor and extending to termination at its other end at a location exterior of the periphery of an upper portion of said track substantially within a plane parallel to the general plane of crawling movement of said track, an arm member connected at one of its ends to said fixing member for pivotal movement within said parallel plane, a blade member attached to the other end of said arm disposed across the width of said track, a cam member extending angularly outward from said blade within said general plane of movement of the track and arranged and constructed to be actuated upon contact by each said pawl successively during said movement of the track to lift said blade over each pawl as it passes under the blade, and bias means for biasing said blade of the apparatus against said track surface of the track, and linkage means connecting said apparatus with apparatus control means at an operator's station of said tractor arranged and constructed for actuation to disengage said blade from said surface.

10. A tractor having a pair of spaced apart tracks each formed by an endless series of shoe portions, each shoe portion having a pawl which protrudes outwardly of the track surface thereof, and said tractor having apparatus disposed generally at an end thereof for cleaning dirt and the like from said track surfaces of the shoe portions of both said tracks, said apparatus comprising a pair of fixing members each attached at one of its ends to a body portion of said tractor proximate to one of said tracks and projecting outwardly toward said end of the tractor, a connecting bar attached to the respective ends of said fixing members which are opposite said attached ends thereof, said connection bar extending substantially across the widths of both said tracks, a supporting rod attached to said fixing members and disposed generally parallel to and substantially coextensive with said connecting bar and interior thereof with respect to the body of said tractor, said connecting bar and supporting rod exterior of the peripheries of an upper portion of both said tracks, two pairs of substantially L- shaped and coextensive arms pivotally connected substantially at their midpoints to said supporting rod and each pair at a location along the length of said supporting rod; whereat both arms of the pair lie substantially within the width of the plane of crawling movement of one of said tracks, each said pair of arms attached for coincident movement by a bar extending between the leg portions thereof, the lower leg portions of said L-shaped arms each having a free end extending toward said tracks, a blade connecting said free ends of each said pair of arms, a blade cam member extending angularly outward from each said blade within said general plane of movement of the tracks and arranged and constructed to be actuated upon contact by each said pawl in the track with which it is associated successively during said movement of the track to lift said blade with which it is associated over each pawl as it passes under the blade, and spring bias means extending between said connecting bar and the upper leg portion of each said pair of L-shaped arms for biasing each said blade of the apparatus against said track surface of the track with which it is associated.

11. Apparatus for cleaning dirt and the like from the ground contacting surface of a track of a tractor, said track including at least one protruding pawl, comprising a tractor connection member adapted for attachment to a body portion of said tractor, an arm member connected to said connection member for pivotal movement in a plane substantially parallel to the general plane of crawling movement of said track, a blade member attached to said arm and disposed to project generally perpendicular with respect to said plane of movement of said arm across the width of said track substantially in the plane of said surface thereof, a blade cam member arranged and constructed for operation association with said pawl of the track to lift said blade over said pawl as it passes said blade during said movement of the track, and bias means for biasing said blade against said surface of the track.

References Cited in the file of this patent
UNITED STATES PATENTS

| | | |
|---|---|---|
| 607,014 | Bostwick | July 12, 1898 |
| 1,741,878 | Rasmussen | Dec. 31, 1929 |
| 2,537,745 | Daniels | Jan. 9, 1951 |
| 2,560,307 | Slemmons | July 10, 1951 |